Aug. 30, 1966        H. J. WANDERER        3,269,530
UNIT PACKAGE WITH HANDLE DEVICE
Filed Aug. 30, 1965        2 Sheets-Sheet 1

INVENTOR.
HERBERT J. WANDERER
BY Robert W. Beart
His Att'y

Aug. 30, 1966   H. J. WANDERER   3,269,530
UNIT PACKAGE WITH HANDLE DEVICE
Filed Aug. 30, 1965   2 Sheets-Sheet 2
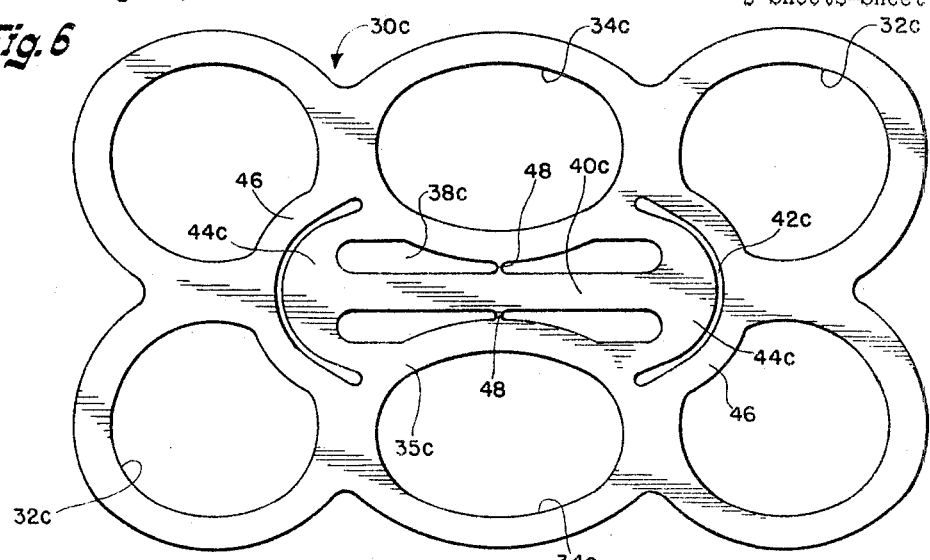
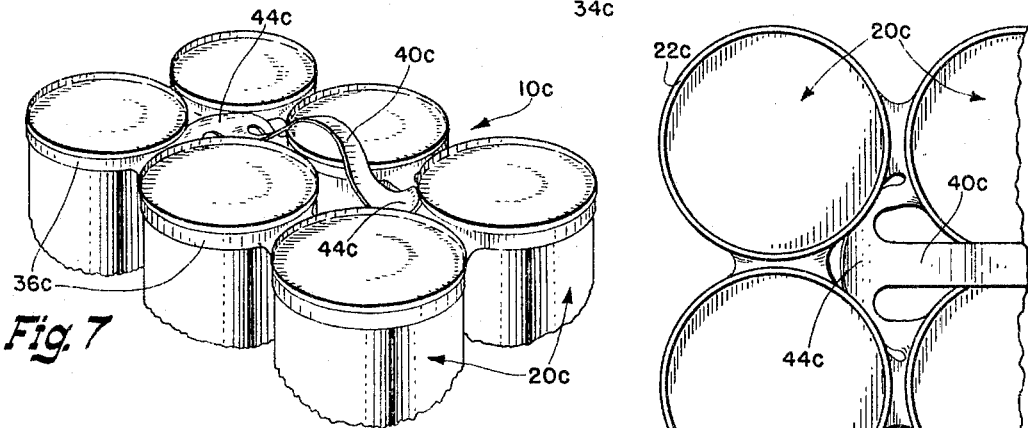
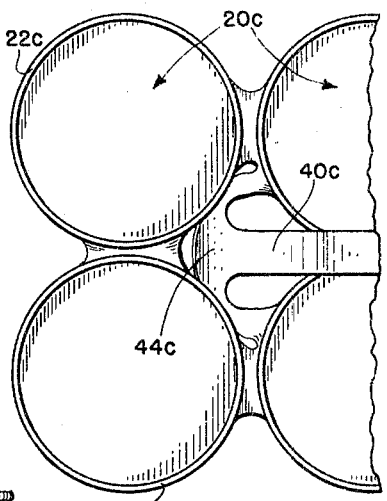
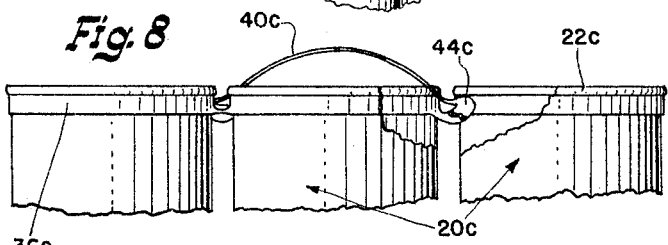
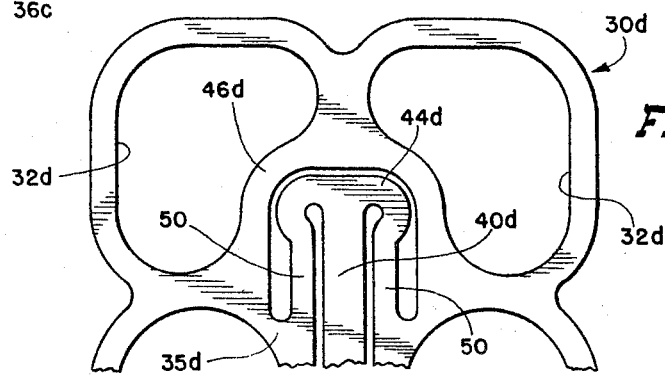
INVENTOR.
HERBERT J. WANDERER
BY
HIS ATT'Y United States Patent Office 3,269,530
Patented August 30, 1966

3,269,530
UNIT PACKAGE WITH HANDLE DEVICE
Herbert J. Wanderer, Elmhurst, Ill., assignor to Illinois Tool Works Inc., Chicago, Ill., a corporation of Delaware
Filed Aug. 30, 1965, Ser. No. 486,592
14 Claims. (Cl. 206—65)

This is a continuation-in-part of patent application Serial No. 378,240, filed June 26, 1964, now abandoned.

This invention relates to a package or article carrier, and more particularly, to a receptacle for holding and carrying containers used for dispensing beverages and the like, and to the resulting package unit.

Various packaging techniques have been employed to secure and transport a plurality of containers, usually six in number. In the general order of their chronological development, these packaging techniques include paperboard carriers of either the wrap-around or compartmentalized types, metallic or plastic carrier clips, and plastic sheet carriers. I have found that plastic sheet carriers of the type disclosed and claimed in U.S. Patent No. 2,874,835, dated Feb. 24, 1959, to O. J. Poupitch are superior from an overall standpoint. Carriers of this type are formed from a single sheet of unsupported plastic material, such as polyethylene, and are provided with suitable apertures so that containers can be axially inserted through the apertures to stretch and deform the material surrounding the apertures for engaging and resiliently gripping the containers to resist their withdrawal. Some of the advantages of these plastic sheet carriers are that they can be quickly and efficiently manufactured in large numbers at a relatively low cost by conventional die cutting or injection molding apparatus, and are relatively easily applied to the cans by suitable applicating equipment. In addition, the containers are aggressively held to the carrier until it is desired to remove them, and this can be accomplished quite esaily as is well known in the art. The present invention is an improvement over carriers of this type as will subsequently appear.

In applying sheet plastic carriers to the containers, some difficulties have been experienced in that stresses are set up in the plastic material as it is deformed and stretched to the shape of the containers. This, together with the fact that the carrier, for economical and other reasons, does not have large areas of material, has previously required the use of a separate handle which is attached to the carrier after it is applied to the containers or finger gripping apertures.

It will be appreciated that a separate handle arrangement increases the cost of the carrier device, and finger gripping apertures although serving as a convenient gripping means, do not always provide a good grip for the user, and it becomes rather strenuous to transport containers over a long distance when such is employed. In U.S. Patent No. 2,989,177, dated June 20, 1961, to E. G. Swick, an integral handle strap has been proposed in a plastic sheet carrier. The relatively small amount of material in such a carrier has restricted the amount of deflection of the handle strap above the plane of the carrier sheet, thus making it relatively difficult to obtain a good grasp. Furthermore, effective positioning and maintenance of such an integral handle strap above the plane of the carrier to facilitate grasping thereof is also a problem which must be considered in employing an arrangement of this type.

It is, therefore, an object of the present invention to provide an improved form of plastic sheet carrier which overcomes the above noted disadvantages and/or difficulties.

Another object of the present invention is the provision of an improved plastic carrier or receptacle having an integral handle member which has a relatively large amount of deflection upwardly from the plane of the carrier to facilitate manual transportation of a plurality of containers.

Still another object of the present invention is the provision of an improved plastic carrier, having an integral handle of the aforementioned type, which provides an effectively larger handle loop than the apparent height thereof in a flat portion to facilitate grasping of the handle and carrying of the carrier package.

Yet another object of the present invention is the provision of an integral, deflectable handle strap in a plastic sheet carrier which is positioned and effectively maintained above the plane of the carrier for convenient grasping and carrying thereof.

A still further object of the present invention is the provision of an improved plastic carrier, having an integral handle of the aforenoted type, where substantially no strains are imparted to any one area of the handle.

The limited amount of material in sheet plastic carriers has also made it impractical to incorporate alternate handle arrangements. Either a separate or integral handle, or finger gripping apertures have been used, but it was not thought possible to incorporate an alternate handle means in a sheet plastic carrier.

In accordance with the present invention, there is provided an improved sheet plastic carrier having an alternate handle arrangement, either handle being available for transporting the containers.

In addition to the aforementioned objects, it is an object of the present invention to provide an integral sheet formed carrier having a handle which is comfortable to the hand and of adequate strength, and yet which does not interfere with other carrier packages during shipment.

Other and further objects and advantages of the present invention will become apparent from the following description when taken in connection with the accompanying drawings wherein:

FIG. 6 is also a top plan view of a modified form of sheet plastic carrier coming within the purview of the present invention;

FIG. 7 is a fragmentary perspective view showing the carrier of FIG. 6 in assembled position on a plurality of containers;

FIG. 8 is a fragmentary side elevational view of the carrier package shown in FIG. 7;

FIG. 9 is an enlarged fragmentary top plan view of the left hand side of the carrier package shown in FIG. 7; and FIG. 10 is a fragmentary top plan view of yet another form of carrier device coming within the purview of the present invention.

Figure 1:
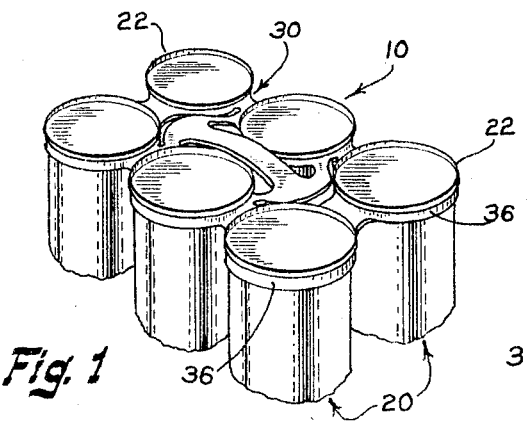
FIG. 1 is a fragmentary perspective view sharing a receptacle or carrier constructed in accordance with the principles of the present invention as associated with a plurality of containers.

Referring now in greater particularity to the drawings, and first to FIG. 1, there is shown a package unit 10 including a plurality of generally cylindrical containers 20 having annular enlargements 22 adjacent the tops of the containers, and a carrier or receptacle 30 for retaining the containers in substantially parallel and abutting relationship as will be apparent. The containers 20 shown in the drawings are of the beverage or beer can variety; however, it is to be understood that the term "containers" as used herein includes any articles or objects of different size and configuration which are suitable for packaging.

Figure 2:
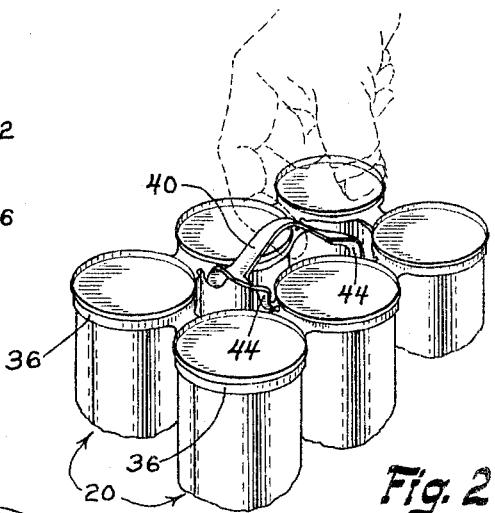
FIG. 2 is also a fragmentary perspective view illustrating a receptacle and container package unit during the manual transporting of the same.
Figure 4:
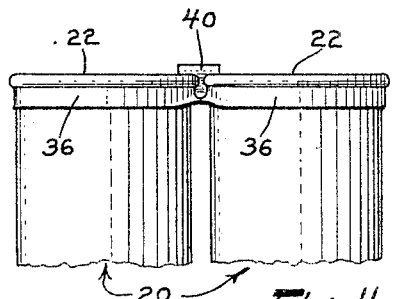
FIG. 4 is a fragmentary end elevational view of the package unit shown in FIGS. 1–2.
Figure 5:
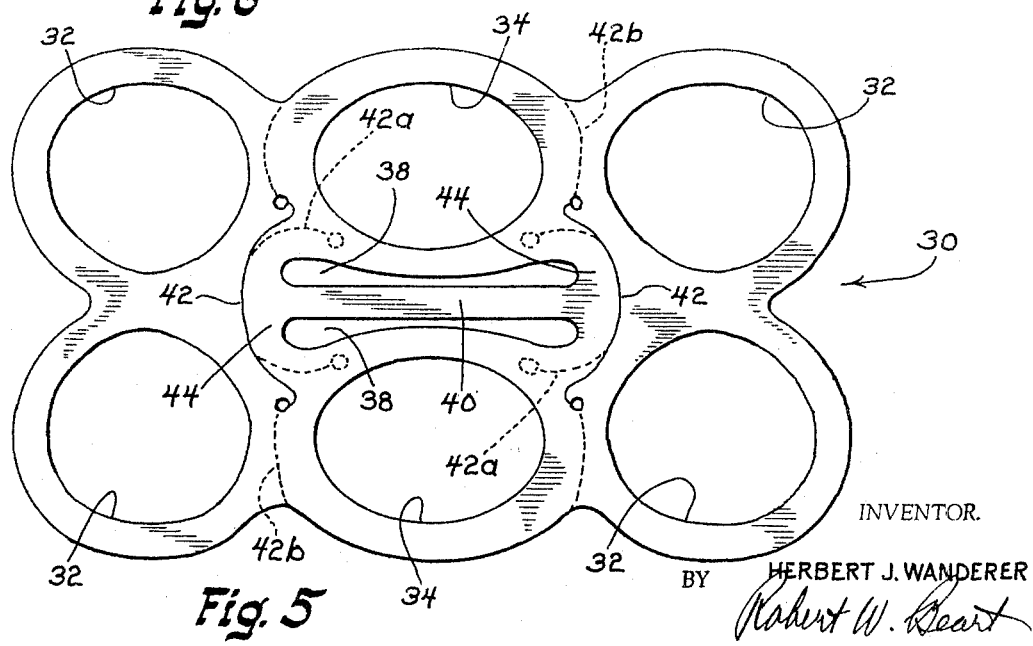
FIG. 5 is a top plan view of the sheet plastic carrier constructed in accordance with the principles of the present invention, and prior to association with the containers.

As best seen in FIG. 5 of the drawings, the carrier or receptacle 30 of the present invention comprises a flat sheet of plastic material, polyethylene being one example. The sheet 30 is provided adjacent its four corners with four circular apertures or pockets 32. Intermediate these apertures, there is provided two elliptical apertures or pockets 34 which are elongated lengthwise of the sheet. The containers 20 are adapted to be axially inserted through the apertures 32, 34 to cause the material adjacent each of the apertures to stretch and deform to the shape of axially directed necks 36 as seen in FIGS. 1-2 and 4 for engaging and resiliently gripping the containers in the vicinity of and below the annular enlargements 22 to resist container withdrawal. Since the apertures 32, 34 are peripherally continuous and uninterrupted, and are of a size smaller than that of the containers, it is possible to utilize this engaging and resilient gripping ability of the axally directed necks 36 in cases where there are no annular or other enlargements on the containers.

Disposed between the centrally located and elongated apertures 34 of the carrier 30 are a pair of spaced, substantially parallel elongated apertures or slits 38 defining therebetween a handle strap portion 40. As will be apparent, the slits 38 are largest near their ends in order to accommodate the inwardly directed portions 35 of the material adjacent the apertures 34. The slits 38 are arranged in mirror image relationship and extend lengthwise of the sheet in the direction of the major axes of the elliptical apertures 34. Preferably, these slits have a length greater than that of the major elliptical apertures axes for reasons which will subsequently appear.

A second pair of slits 42, preferably curvilinear in form with reversely curving end portions, are formed beyond the terminal portions of the slits 38 and extend generally transverse to the handle strap portion 40. The slits 42 are also arranged in mirror image relationship, and have their reversely curving end portions in general longitudinal alignment with each other. By forming the slits 42 in this manner, a pair of connecting webs 44, traversing the space between the inwardly directed portions 35 of the apertures 34, will be provided for integrally connecting the handle strap portion to the inwardly directed portions 35 of the apertures 34 at points laterally outwardly offset from the handle strap portion. Connecting webs 44 are also linked to the outer extremities of the handle strap portion, and thus attach the handle to four discrete locations of the carrier body as can be readily perceived in FIG. 5. As a result, the receptacle handle takes the form of a pair of generally T-shaped members with the stems thereof joined to one another at their bases, and with the cross-bars of each T-shaped member having their outer extremities joined to the carrier body along inwardly directed portions of the material adjacent the apertures 34.

Figure 3:
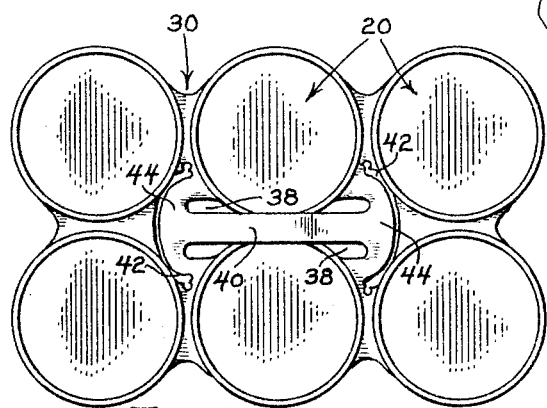
FIG. 3 is a top plan view of the package unit shown in FIGS. 1–2.

The connecting webs 44 serve to increase the upward displacement of the handle strap portion 40 to facilitate manual gripping thereof. When the carrier 30 is applied to the containers, the plastic material adjacent the elliptical apertures 34 will necessarily stretch sideways, and this causes the carrier to draw in longitudinally. This will have the effect of drawing the ends of the strap 40 toward each other to deflect it above the plane of the sheet, and also above the tops of the containers as shown in FIGS. 1 and 3. In this condition, the strap 40 is still flexible and elastic due to the manner in which the connecting webs 44 attach the strap to the carrier body. The elliptical apertures 34 will, of course, have a tendency to draw the material in longitudinally of the carrier, but the slits 42, to a large degree, block any stress transfer when the carrier is applied to the containers to maintain the handle strap 40 and the connecting webs 44 in undeformed condition. This can be readily depicted from an inspection of FIGS. 1 and 3 where it will be observed that the amount of stretching of the strap and connecting webs is very small.

It is important to note that when the carrier device is assembled to the containers, the integral handle strap will overlie the beads or annular enlargements of those containers received within the elliptical apertures or pockets 34 of the carrier as best seen in FIGS. 1 and 3. This is attributed to the fact that the distance between the material portions 35 of the opposed elliptically shaped apertures or sockets 34 in the vicinity of the integral handle strap 40 is less than the transverse measurement of the handle strap. Thus, the handle strap 40 is positioned and retained in overlying relationship to the centrally located containers so as to facilitate grasping thereof by a user in transporting the containers.

The handle strap portion 40 will remain in substantially the position shown in FIGS. 1 and 3-4 of the drawings until it is desired to lift and transport the package. In FIG. 2 of the drawings, a phantom hand is shown as it grasps the handle strap portion 40. It will be observed that the connecting webs 44 will be displaced above the plane of the carrier so as to increase the upward displacement of the handle to facilitate manual gripping thereof. Thus, the connecting webs 44 perform the important function of increasing the apparent height or upward displacement of the strap 40. The connection of the strap 40 to the carrier body by the connecting webs 44 at four discrete locations will also increase the stability of the carrier when transporting the containers.

In addition, should the strap 40 for some reason be caught or trapped in the space between the innermost pair of containers 20 so as to make it relatively difficult to grasp the same, the connecting webs 44 may be used as an alternate handle means. In such a case, the connecting webs 44 will be deflected downwardly and inwardly by the fingers of the user so as to position the user's fingers beneath the connecting webs. The relative position of the connecting webs 44, with respect to the remainder of the carrier, when they are deflected downwardly from the plane thereof is shown by the phantom lines in FIG. 3 of the drawings.

In its preferred form, the slits 42 of the carrier are generally curvilinear throughout the major portion of their length, but have reversely curving end portions as is shown in FIG. 5 of the drawings. This will provide maximum strength to the material adjacent each aperture, as well as the connecting webs 44 and the handle 40. It is also to be noted that any strain imparted to the connecting webs 44 when they are displaced upwardly from the plane of the carrier will be well distributed in view of the fact that the reversely curving portions of the slits 42 and the end portions of the slits 38 have a gentle curve. Sharp, irregular formations in these areas would increase the possibility that the connecting webs would tear or be strained beyond their point of elastic recovery.

If it is desired to further increase the apparent height of the handle 40, it is possible to provide slits 42a in carrier 30a, shown in phantom in FIG. 5 of the drawings, having the ends thereof curving toward, rather than away, from the apertures 34. The relative strength of the connecting webs in this instance will not be as great as in the preferred form; however, this embodiment is representative of various modifications that may be employed.

In the preceding discussion, the carrier has been described as preferably comprising a sheet having six apertures formed therein. It will be apparent, however, that the carrier may only have two apertures if desired. This may be accomplished by forming a carrier 30b having a general outline indicated partially by full lines and also by the phantom lines 42b in FIG. 5 which are, in reality, extensions of the slits 42. The shape of the apertures 34 in this form as well as the embodiment employing six apertures is preferably elliptical since the stretching of the material adjacent thereto upon the insertion of containers will draw the ends of the handle strap 40 toward each other to position it above the tops of the containers. In conjunction with this, the distance between material portions 35 of the opposed elliptical apertures or sockets 34 is such that when the carrier is assembled to containers, this distance is less than the transverse measurement of the integral handle strap to hold the handle strap above the tops of the containers. Thus, the handle strap is effectively positioned and maintained above the plane of the carrier in the aforesaid manner.

A modified form of carrier member is shown in FIG. 6 of the drawings, and is generally similar to the above described embodiments as indicated by the application of identical reference numerals with the suffix "c" employed to designate like parts. FIGS. 7–9 are intended to depict the carrier member 30c as assembled to a plurality of containers 20c to form the package unit 10c as will be apparent.

In carrier member 30c, it will be noted that the handle strap portion 40c together with the connecting webs 44c at opposite ends thereof have a substantially greater length than the handle strap and the connecting webs of the carrier 30 due to the fact that the connecting webs 44c extend at least partially between upper and lower apertures or sockets 32c on opposite sides of the carrier 30c. This is attributed to the fact that each of the apertures 32c in the vicinity of the connecting webs 44c are provided with a radially inwardly directed portion 46 generally curvilinear in form to thereby create generally "kidney-shaped" apertures or sockets 32c. The radially inwardly directed portion 46 adjacent each aperture 32c conforms generally to the outer periphery of one-half of a connecting web and cooperates with an adjacent radially inwardly directed portion 46 to provide a generally semi-circular configuration for accommodating a connecting web 44c.

This particular arrangement provides several important advantages. First of all, the increased length of the handle strap portion 40c together with the connecting webs 44c in their flat condition as shown in FIG. 6 of the drawings creates an effectively larger loop when the carrier 30c is assembled to containers such as 20c in FIG. 7 of the drawings. As will be apparent, this will provide a more effective and convenient gripping handle than is shown in the previous embodiment. Furthermore, the connecting webs 44c will be in a position to engage outer surface areas of the outermost pair of containers 20c on opposite sides of the package 10c so as to foreshorten the handle strap portion 40c as best seen in FIGS. 7–8 of the drawings. As a result, the handle strap portion 40c will be positioned and maintained a predetermined distance above the tops of the containers 20c to permit one or more fingers of a user's hand to be readily inserted therebetween without first lifting the handle strap portion as would be necessary in the previous embodiments.

The particular manner in which the connecting webs 44c engage the outermost pairs of containers in the package 10c is best seen in FIGS. 8–9 of the drawings. There will be seen that the connecting webs 44c engage each pair of the outermost containers adjacent to, but slightly below the rims 22c so as to underlie the same and prevent the connecting webs 44c from sliding over and out of engagement with outer side wall surfaces adjacent the rims of containers. In this manner, the handle strap portion 40c is maintained in a foreshortened condition for the above described purposes. It will be recognized that the distance between inwardly directed material portions of the opposed elliptical apertures 34c is also less than the transverse measurement of the handle strap portion 40c when the carrier is applied to the containers, but this is not as important in this particular embodiment since the handle strap 40c will be maintained a substantial distance upwardly from the tops of the centrally positioned containers. However, this particular aspect is important when stacking packages 10c one above the other. It will be apparent that the handle strap 40c is capable of flexing downwardly into the openings between the centrally positioned containers and each pair of outermost positioned containers due to its configuration and inherent resiliency. When this is done, it is important that the handle strap 40c is prevented from being moved intermediate the centrally positioned containers as this will cause it to lose its effectiveness as a carrying handle. The distance between innermost portions of the elliptical apertures relative to the transverse measurement of the handle strap portion so as to prevent entrapment between the centrally positioned containers thus becomes important in maintaining the handle strap portion available for convenient grasping thereof in the manner above described when exposed by removing an uppermost package 10c relative to the next adjacent package positioned therebelow.

The carrier member 30c, as seen in FIG. 6, of the drawings, is initially formed with a pair of readily fracturable connecting tabs 48 which initially joins the handle strap portion 40c to the inwardly directed marginal portion 35c surrounding the centrally positioned elliptically shaped apertures or sockets 34c so as to maintain the handle strap 40c in the plane of the carrier until assembled to the containers. This will enable the carrier member 30c to be readily and continuously applied by automatic applicating mechanisms without any interference with operating parts thereof.

Reference is now made to FIG. 10 of the drawings for a description of the last illustrated embodiment of the present invention which is generally similar to the embodiment previously described as will be apparent by the application of like reference numerals with the suffix "d" employed to designate like parts. It will be recognized that only about one-half of the carrier 30d is shown, but it will be understood that due to the symmetrical arrangement of the carrier members disclosed by the present invention, the lower half of the carrier not shown in FIG. 10 of the drawings is identical in shape and configuration. In this form of the invention, the outermost apertures 32d are also "kidney-shaped" in form, but the outwardly extending material portions surrounding the apertures 32d are more rectilinear, rather than curvilinear in shape. This modification has been made principally for the purpose of accommodating the handle strap portion 40d and the connecting webs 44d including the reversely extending portions 50 thereof. It will be recognized, by comparing carriers 30c and 30d that the reversely extending portions 50 of the carrier member 30d which joins its associated connecting web 44d to the inwardly directed material portions 35d adjacent the centrally positioned apertures, extends substantially parallel to outermost material portions of the handle strap 40d for a substantial distance. The obvious advantage of this particular arrangement is that the integral carrying handle of the carrier member 30d including the handle strap portion, and its connecting webs 44d as well as portions 50 can be positioned upwardly from the tops of the containers with which the carrier member is associated a greater distance than the previous embodiments. All of this is possible while at the same time enjoying the advantages which accrue through a carrier member of the type shown in the previous embodiments.

It will now be appreciated that a superior sheet plastic carrier has been provided for transporting containers and other objects. The carrier is provided with an upwardly deflectable, integral handle which provides an effectively larger handle loop than was available in heretofore known sheet carrier members. The handle is effectively positioned and maintained above the tops of containers with which it is to be associated so as to facilitate gripping thereof, and in certain of the embodiments shown by the present invention, the handle is positioned and maintained a predetermined distance upwardly from the tops of the container members to enable one or more fingers to be readily inserted below the handle without lifting the same. In the event that the handle is inadvertently displaced or trapped intermediate a pair of generally opposed containers, it is still possible to lift and transport the container package due to an ultimate handle arrangement. Thus, the carrier member accommodates itself to a variety of situations, and yet compares favorably from an economic standpoint from previously developed sheet plastic carriers as well as paperboard cartons and connector clips.

While the preferred embodiments of the present invention have been shown and described herein, it is obvious that many structural details may be changed without departing from the spirit and scope of the appended claims.

1. A carrier package comprising a plurality of containers or the like, and a resilient, elastic and deformable sheet of plastic material having at least a pair of oppositely arranged, elliptically-shaped sockets provided therein, said sockets being longitudinally arranged on said carrier with the major axes thereof being substantially parallel to each other, the material adjacent each of the sockets having a peripheral measurement less than that of the corresponding container associated therewith whereby upon the insertion of containers axially into the sockets, the aforementioned material is caused to stretch and deform to the shape of the containers for gripping and resiliently engaging the containers to resist container withdrawal, and handle means provided intermediate the opposed sockets and being longitudinally arranged on the carrier by a pair of longitudinally extending spaced slit means permitting the intermediate web portion therebetween to become said handle means, the distance between material portions of the opposed, elliptically-shaped sockets in the vicinity of said handle means being less than the transverse measurement of said handle means, said carrier being assembled to said containers enabling the handle means to be positioned and retained in overlying relationship relative to the containers received within the opposed sockets and facilitate grasping thereof by a user for transporting the containers.

2. A carrier package comprising a plurality of containers or the like, and a resilient, elastic and deformable sheet of plastic material having a plurality of pairs of oppositely arranged sockets provided therein, a centrally located pair of oppositely arranged sockets being elongated lengthwise of the sheet with the major axes thereof disposed substantially parallel to each other, the material adjacent each of the sockets having a peripheral measurement less than that of the corresponding containers with which it is to be associated whereby upon the insertion of containers axially into the sockets, the aforementioned material is caused to stretch and deform to the shape of the containers for gripping and resiliently engaging the containers to resist container withdrawal, and handle means provided intermediate the opposed, elongated sockets and being longitudinally arranged on the carrier by a pair of longitudinally extending spaced slit means permitting the intermediate web portion therebetween to become said handle means, the distance between material portions of the opposed, elongated sockets in the vicinity of said handle means being less than the transverse measurement of said handle means when said carrier is assembled to said containers thereby enabling said handle means to be positioned and retained in overlying relationship relative to containers received within the opposed, elongated sockets and facilitate grasping thereof by a user in transporting the containers, a second pair of slit means provided beyond the terminal portions of the first set of slit means and traversing the same providing connections of said handle means with said carrier at points laterally outwardly offset of the aforementioned handle means whereby to present a handle having an apparent height greater than the first pair of slit means forming said handle means.

3. The carrier package as set forth in claim 2 wherein said second pair of slit means is spaced from each other by a dimension not greater than the maximum distance between any two extended fingers of a user's hand to also permit grasping of portions of the material between said second pair of slit means in a manner transverse to said handle means for transporting said containers.

4. The carrier package as defined in claim 2 wherein the apparent height of the handle is varied according to the increase or decrease in the length of the connections between said handle means and said carrier.

5. The carrier package as defined in claim 2 wherein each of said sockets comprises a through aperture provided in said sheet carrier.

6. The carrier package as set forth in claim 2 wherein said handle means has a length greater than the major axes of said elongated sockets.

7. The carrier package as set forth in claim 2 wherein said handle means has a width and thickness generally corresponding to the material adjacent each of said sockets.

8. The carrier package as defined in claim 2 wherein each of the connections between said handle means and said sheet carrier comprises a curvilinear connecting web.

9. The carrier package as defined in claim 2 wherein said handle means at opposite ends thereof extends at least partially between an outermost pair of opposed sockets on opposite sides of said sheet carrier to cause the ends of said handle means to engage containers inserted within the outermost pairs of sockets and thereby foreshorten said handle means to provide an upwardly extending loop to facilitate grasping thereof by a user.

10. The carrier package as defined in claim 2 wherein each of said containers are provided with annular enlargements on at least the upper end thereof, and said handle ends are adapted to engage container surfaces immediately below said annular enlargements.

11. The carrier package as defined in claim 2 wherein said handle means is initially connected to marginal portions adjacent the opposed, elongated sockets by readily fracturable connecting tabs of limited size to maintain the handle means in the plane of the sheet carrier while containers are inserted within the sockets thereof, said readily fracturable connecting tabs adapted to be broken to provide a handle convenient for carrying the carrier package.

12. The carrier package as defined in claim 2 wherein the connections between said handle means and said sheet carrier comprises a pair of reversely extending portions directed from and on opposite sides of each end of said handle means for a predetermined distance and disposed substantially parallel thereto.

13. A carrier package comprising a plurality of containers having curvilinear cross-sections and annular enlargements on at least one end thereof, and a resilient, elastic and deformable sheet carrier of plastic material having a plurality of apertures therein with a centrally located pair of opposed apertures being elongated lengthwise of the sheet, a longitudinally extending handle strap portion disposed between said centrally located, opposed apertures and being spaced throughout its length from inwardly directed portions of the material adjacent the opposed, centrally located apertures, said handle strap portion being joined to the inwardly directed material portions of said centrally located apertures by connecting webs traversing the space therebetween, the material adjacent each of the apertures of said sheet being of a size and construction whereby the insertion of the containers axially through said apertures causes the material to stretch and deform to the shape of axially directed necks for engaging and resiliently gripping the containers in the vicinity of and below said enlargements to resist container withdrawal, said handle strap portion being displaced above the plane of the sheet upon the insertion of said containers, the distance between the inwardly directed portion of the material adjacent the centrally located apertures in the vicinity of said handle strap portion being less than the transverse measurement thereof, said sheet carrier being assembled to said containers thereby enabling said handle strap portion to be positioned and maintained in overlying relationship to a portion of said containers received within the opposed, centrally located apertures and facilitate grasping thereof by a user in transporting the containers.

14. A carrier package comprising a plurality of containers or the like, and a resilient, elastic and deformable sheet of plastic material having a plurality of generally oppositely arranged apertures therein, the material adjacent each of the apertures having a peripheral measurement less than that of the corresponding container with which it is to be associated whereby the insertion of containers axially through said apertures causes the material to stretch and deform for engaging and resiliently gripping the containers to resist container withdrawal, and handle means integral with and provided intermediate at least a pair of generally opposed apertures, said handle means including means positioning and maintaining at least a portion thereof above the tops of said containers to facilitate grasping thereof by a user for transporting the carrier package.

References Cited by the Examiner

UNITED STATES PATENTS

| | | | |
|---|---|---|---|
| 2,482,399 | 9/1949 | Bullock | 229—54 |
| 2,989,177 | 6/1961 | Swick | 206—65 |
| 3,084,792 | 4/1963 | Poupitch | 206—56 |

THERON E. CONDON, *Primary Examiner.*

W. T. DIXSON, *Assistant Examiner.*